United States Patent [19]

Choi

[11] Patent Number: 4,847,875

[45] Date of Patent: Jul. 11, 1989

[54] TIMING CIRCUIT INCLUDING JITTER COMPENSATION

[75] Inventor: DooWhan Choi, Salem, N.H.

[73] Assignees: American Telephone and Telegraph Company, New York, N.Y.; AT&T Bell Laboratories, Murray Hill, N.J.

[21] Appl. No.: 19,009

[22] Filed: Feb. 26, 1987

[51] Int. Cl.⁴ .............................................. H04L 7/08
[52] U.S. Cl. .................................... 375/112; 375/120; 370/102
[58] Field of Search ......................... 375/120, 112, 81; 331/1 R, 17, 25; 328/155; 370/102

[56] References Cited

U.S. PATENT DOCUMENTS

| | | |
|---|---|---|
| 4,061,973 | 12/1977 | Reimers et al. |
| 4,166,979 | 9/1979 | Waggener ............................ 375/120 |
| 4,651,026 | 3/1987 | Serfaty et al. ........................ 375/120 |
| 4,654,859 | 3/1987 | Kung et al. |
| 4,759,041 | 7/1988 | Anderson et al. ................... 370/102 |
| 4,771,426 | 9/1988 | Rattlingourd et al. ............. 370/102 |

OTHER PUBLICATIONS

"Phase-Locked Loop", *Transmission Systems for Communications*, Fifth Edition, Bell Telephone Laboratories, Incorporated, 1982, pp. 688-692.

*Primary Examiner*—Benedict V. Safourek
*Assistant Examiner*—Marianne Huseman
*Attorney, Agent, or Firm*—Thomas Stafford

[57] ABSTRACT

An output timing signal is generated by a phase locked loop. The loop includes a phase detector, a low-pass filter and a voltage controlled oscillator. A reference signal that is in synchronism with an incoming digital signal is divided by a first divisor to generate a reference clock signal. The reference clock signal is supplied as a first input to the phase detector. A phase clock signal is generated in the loop by dividing the output timing signal by a second predetermined divisor. The phase clock signal is supplied as a second input to the phase detector to generate an error signal for controlling the oscillator. The first and second divisors are selected to eliminate jitter caused by large gaps in the incoming digital signal resulting from overhead bit removal. Additionally, the phase clock signal is controllably compensated to cause variations in the bit rate of the output timing signal which correspond to variations in the actual data rate of the incoming digital signal because of stuffing bits. The compensation of the phase clock signal is dependent on the number of data bits and the number of non-data bits in the stuffing bit positions.

14 Claims, 2 Drawing Sheets

CHANNEL FRAME FORMAT

TIMING CIRCUIT INCLUDING JITTER COMPENSATION

TECHNICAL FIELD

This invention relates to timing circuits for use in digital transmission systems and, more particularly, to timing circuits including a phase locked loop.

BACKGROUND OF THE INVENTION

It is well-known that local timing signals in a digital receiver must be synchronized to an incoming digital signal in order to recover the data. Heretofore, such timing signals were recovered from the incoming digital signal by employing a phase locked loop. The phase locked loop was responsive to the incoming digital signal for generating a phase error signal which, in turn, controls a voltage controlled oscillator to generate a local timing signal.

In frames of certain incoming digital signals, there are additional overhead bit positions and so-called stuffing bit positions which when eliminated leave gaps in the data stream. Because of such gaps, the recovered timing signal generated by a typical phase locked loop arrangement is not smooth causing jitter. As is well-known, jitter is extremely undesirable in timing signals. Additionally, it is desirable that the generated timing signal follow variations in the incoming digital signal caused by the stuffing bits.

SUMMARY OF THE INVENTION

The problem of jitter in a recovered timing signal caused by overhead bit removal from an incoming digital signal is overcome, in accordance with an aspect of the invention, by employing a clock signal that is synchronous with the incoming data signal as an input to a phase locked loop. The clock signal is divided by a first predetermined divisor to obtain a reference clock signal which is supplied as a first input to a phase detector in the phase locked loop. An output timing signal generated by the phase locked loop is divided by a second predetermined divisor to obtain a phase clock signal which is supplied as a second input to the phase detector. The phase detector generates a phase error signal which, in turn, controls a voltage controllable oscillator that generates the output timing signal. The first predetermined divisor is selected, in accordance with an aspect of the invention, to be in a prescribed relationship to the total number of bits in a frame of the incoming digital signal. The second predetermined divisor is selected, in accordance with an aspect of the invention, to be in a prescribed relationship with the number of data bits in a frame of hte incoming digital signal.

Variations in the output timing signal which follow variations in the actual data rate of the incoming digtal signal caused by stuffing bits are generated, in accordance with another aspect of the invention, by controllably compensating the phase clock signal generated in the phase locked loop. The phase clock signal compensation is dependent on the number of stuffing bit positions that include data or non-data bits.

BRIEF DESCRIPTION OF THE DRAWING

The invention will be more fully understood from the following detailed description of an illustrative embodiment taken in conjunction with the appended figures in which.

DETAILED DESCRIPTION

Figure 2:
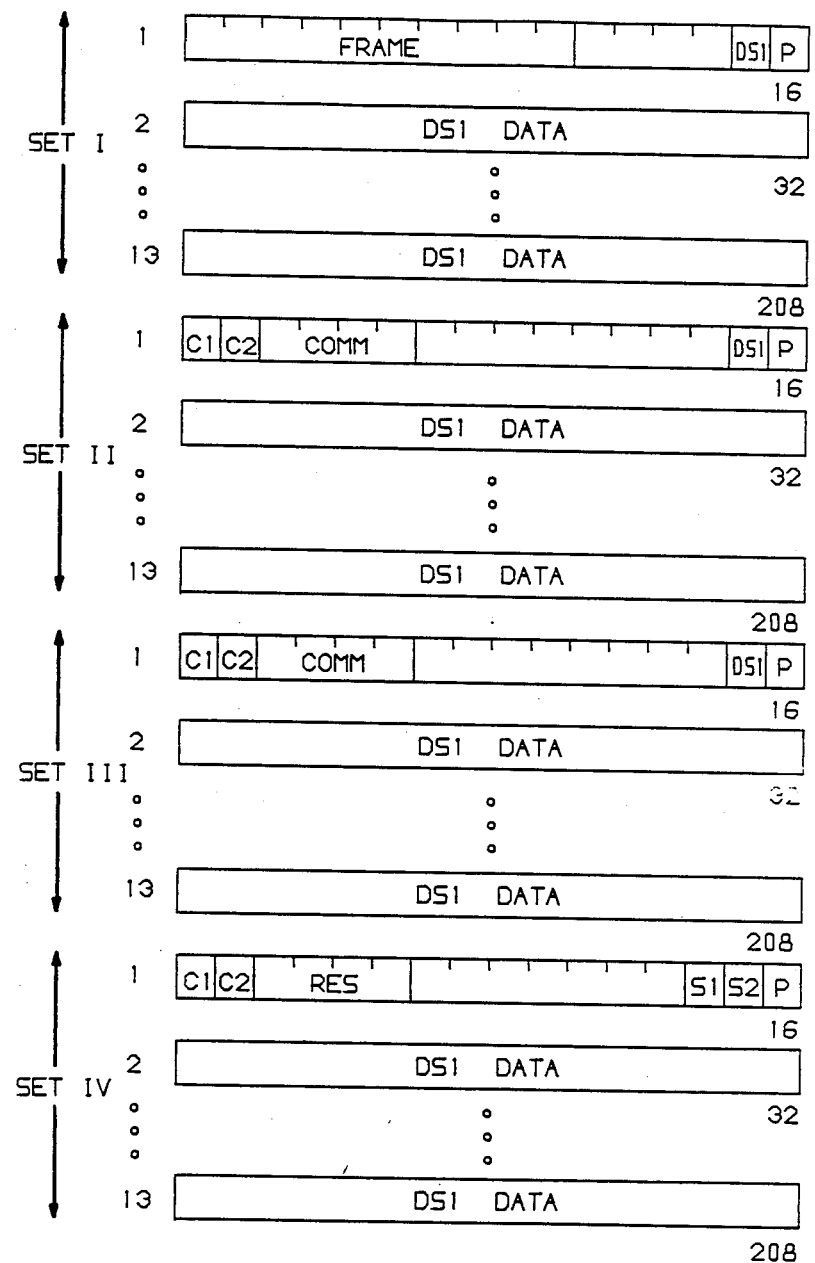
FIG. 2 illustrates a channel frame format of a signal for which the invention of FIG. 1 may be employed.

As indicated above, certain incoming digital signals may have large gaps in the data stream because of overhead bits and also because of stuffing bits. Several such signal formats are disclosed in co-pending U.S. patent application Ser. No. 769,427 filed Aug. 26, 1985. Specifically, attention is direct to FIGS. 4–7 of the application Ser. No. 769,427. One example of such a channel frame format is shown in FIG. 2. This particular channel frame format may be used for the DSI digital signal.

Figure 1:
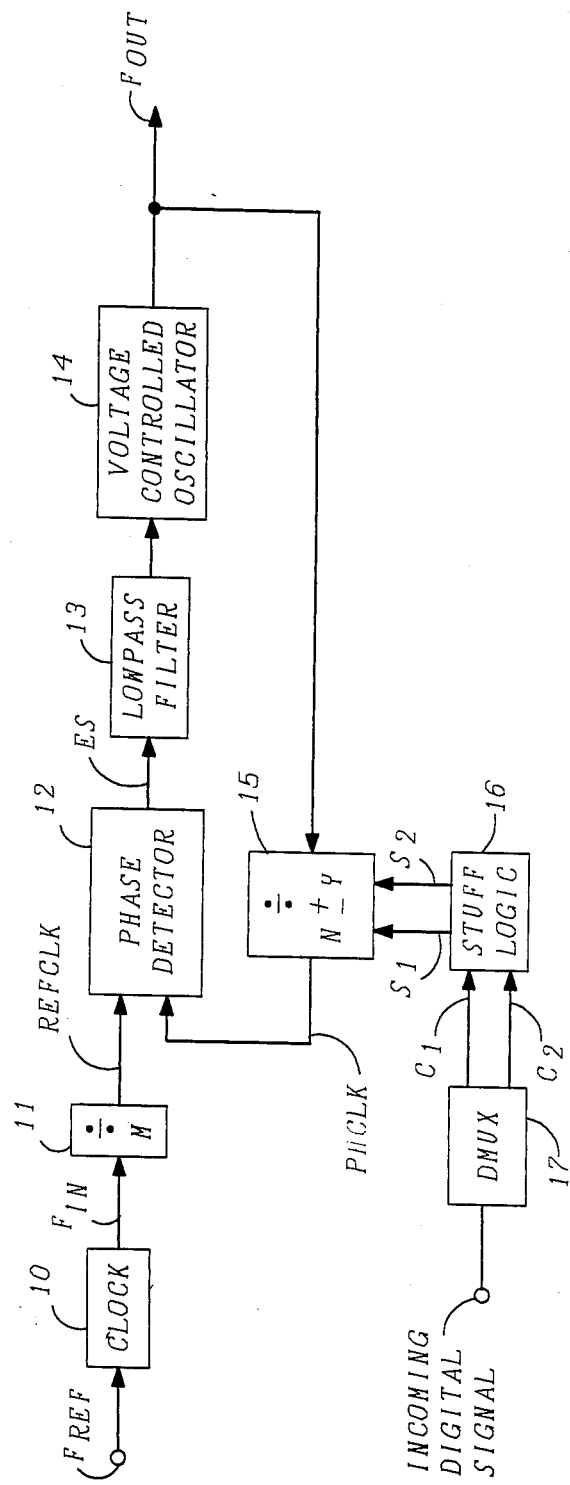
FIG. 1 shows in simplified block diagram form a timing circuit employing a phase locked loop incorporating an embodiment of the invention.

FIG. 1 depicts in simplified block diagram form a timing circuit including an embodiment of the invention. Accordingly, shown is local clock 10 which is responsive to a known reference signal $F_{REF}$ for generating timing signal $F_{IN}$. Reference signal $F_{REF}$ is, for example, the so-called Basic Synchronization Reference Frequency (BSRF) signal which is used to derive timing signals for synchronous digital transmission systems.

In certain applications, signal $F_{IN}$ may not be at the same rate as the incoming digital signal and divider 11 is used to obtain a desired reference clock (REFCLK) rate. REFCLK is supplied as a first input to phase detector 12. First predetermined divisor M of divider 11 is selected, in accordance with an aspect of the invention, to be in a prescribed relationship with the total number of bits in a frame of the incoming digital signal. The prescribed relationship being that divisor M is a predetermined fractional protion of the total number of bit positions in a frame of the incoming digital signal. In one example, not to be construed as limiting the scope of the invention, the total number of bits in a frame of the incoming digital signal is 832, as shown in FIG. 2, divisor M is selected to be 208 and $F_{IN}$ is 1.664 MHz to obtain REFCLK=8 KHz. Thus, in this example, it is seen that divisor M is one fourth the total number of bits in the frame of the incoming digital signal. Similarly, for the DS1C and DS2 digital signals the total number of bits in a frame is 832 and divisor M=208. A phase clock (PHCLK) signal derived from the phase locked loop output timing signal $F_{OUT}$ is supplied as a second input to phase detector 12. Phase detector 12 generates an error signal (ES) in known fashion which is proportional to the algebraic difference between REFCLK and PHCLK. Error signal ES is supplied from phase detector 12 to low pass filter 13 which yields a smooth version thereof. In turn, the output from low pass filter 13 is supplied to control voltage controlled oscillator 14 in well-known fashion to generate output timing signal $F_{OUT}$. Output timing signal $F_{OUT}$ is the desired local timing signal and is also feedback to controllable divider 15 which generates PHCLK. Second predetermined divisor N of controllable divider 15 is selected, in accordance with an aspect of the invention, to be in a prescribed relationship to the number of data bits in a frame of the incoming digital signal. The prescribed relationship being that divisor N is a predetermined fractional portion of the number of data bits in a frame of the incoming digital signal. In one example, not to be construed as limiting the scope of the invention, the number of data bit positions in a frame of the incoming digital signal is 772 corresponding to the DS1 digital rate as shown in FIG. 2 and divisor N is selected to be 193, to obtain REFCLK=8 KHz. Thus, in this example, it is seen that divisor N is one fourth the number of data bits in the frame of the incoming digital signal. Similarly, for the DS1C digital signal the number of data bits in a frame is 788 and for the DS2 digital signal the number of data bits in a frame is 789, and for both divisor N=197. The selection of divisors M and N of dividers 11 and 15, respectively, in the manner described eliminates jitter in the output timing signal $F_{OUT}$ caused by large gaps resulting from overhead bit removal from the incoming digital signal.

It is desirable to have variations in the bit rate of output timing signal $F_{OUT}$ that follow variations in the actual data rate of the incoming digital signal which are caused by the content of the stuffing bit positions. To this end, controllable divider 15 is controlled by signals S1 and S2 from stuff logic 16 to compensate, in accordance with an aspect of the invention, PHCLK depending on the content of the stuffing bit positions in the incoming digital signal. In this example, not to be construed as limiting the scope of the invention, two stuffing bit positions S1 and S2 are assumed as shown in FIG. 2. The content of each stuffing bit position as data or non-data is transmitted in each frame of the received signal by so-called stuffing bit indicator bits $C_1$ and $C_2$ for stuffing bit positions S1 and S2, respectively. In this example, three $C_1$ bits and three $C_2$ bits are in each frame of the incoming signal as shown in FIG. 2. Stuffing indicator bits C1 and C2 are obtained from the incoming signal by employing demultiplexer (DEMUX) 17, in well known fashion. A majority decision is made in stuff logic 16 as to whether the corresponding stuffing bit position includes a data bit or a non-data bit. Thus, a non-data bit is indicated by two or all logical 1's in the corresponding C-bit ($C_1$ or $C_2$) positions and a data bit is indicated by two or all logical 0's. For normal operation, $S_1$ is a non-data bit represented by a logical 1 and S2 is a data bit represented by a logical 0. Consequently, in response to S1=1 and S2=0, divider 16 divides $F_{OUT}$ by the second predetermined divisor having the nominal value N. In this example, the normal bit rate of $F_{OUT}$ is 1.544 MHz (corresponding to the DS1 digital rate) and N=193 to generate PHCLK=8 KHz. When both stuffing bit positions include non-data bits as indicated by S1=1 and S2=1, divider 16 divides $F_{OUT}$ by a third predetermined divisor having a value N-Y, where in this example Y=1. This causes PHCLK to increase slightly which, in turn, causes error signal ES generated by phase detector 12 to decrease. The decrease in error signal ES causes a slight decrease in the bit rate of $F_{OUT}$. When both stuffing bit positions include data bits as indicated by S1=0 and S2=0, divider 16 divides $F_{OUT}$ by a fourth predetermined divisor having a value N+Y, where in this example Y=1. This causes PHCLK to decrease slightly which, in turn, causes error signal ES generated by phase detector 12 to increase. The increase in error signal ES causes a slight increase in bit rate of $F_{OUT}$. Thus, the bit rate of PHCLK is adjusted to compensate for a decrease in data when both stuffing bit positions are non-data bits and to compensate for an increase in data when both stuffing bit positions are data bits. Consequently, variations are caused in the bit rate of output timing signal $F_{OUT}$ which correspond to the variations in the actual data rate of the incoming digital signal. It is noted that the compensation to PHCLK is on a frame-by-frame basis of the incoming signal.

The invention has been described in the context of eliminating jitter caused by large gaps in an incoming digital signal resulting from overheat bit removal. It will be apparent to those skilled in the art that the invention is equally applicable for use with any incoming digital signal having large gaps whether or not they are caused by overhead bit removal. For example, there may just be excess data bit positions that are not being used. Additionally, the embodiment of the invention has been described in terms of the DS1 digital rate. It will also be apparent to those skilled in the art that the invention is applicable for obtaining a timing signal to correspond to an incoming digital signal having any one of a number of digital rates.

What is claimed is:

1. Apparatus for generating an output timing signal for recovering data from an incoming digital signal having repetitive frames each of which has a predetermined total number of bit positions including a number of data bit positions, the number of data bit positions being less than the total number of bit positions, comprising:
    means for generating a clock signal which is in synchronism with the incoming digital signal;
    first means for dividing said clock signal by a first predetermined divisor to generate a reference clock signal, said first predetermined divisor being a value equal to a first predetermined fractional portion of the total number of bit positions in a frame of the incoming digital signal;
    phase detector means responsive to said reference clock signal and to a phase clock signal for generating an error signal;
    low-pass filter means for generating a control signal representative of a smooth version of said error signal;
    voltage controlled oscillator means responsive to said control signal for generating the output timing signal; and
    second means for dividing said output timing signal by a second predetermined divisor to generate said phase clock signal, said second predetermined divisor being a value equal to a second predetermined fractional portion of the number of data bit positions in the frame of the incoming digital signal.

2. The apparatus as defined in claim 1 wherein the total number of bit positions in the frame of the incoming digital signal is 832 and said first predetermined divisor is 208.

3. The apparatus as defined in claim 2 wherein the number of data bit positions in the frame of the incoming digital signal is 772 and said second predetermined divisor is 193.

4. The apparatus as defined in claim 2 wherein the number of data bit positions in the frame of the incoming digital signal is 788 and said second predetermined divisor is 197.

5. Apparatus for generating an output timing signal for recovering data from an incoming digital signal including repetitive frames each of which has a predetermined number of stuffing bit positions, and a predetermined number of stuffing indicator bit positions including bits which indicate that said stuffing bit positions include either a data bit or a non-data bit therein, the apparatus comprising:
    phase detector means responsive to a first signal representative of a reference signal and to a second signal representative of the output timing signal for generating an error signal;

low-pass filter means for generating a control signal representative of a smooth version of said error signal;

voltage controlled oscillator means response to said control signal for generating the output timing signal;

means for obtaining bits from said stuffing indicator bit positions of the incoming digital signal; and means supplied with said output timing signal for generating said second signal, said means for generating said second signal including means responsive to said bits from said stuffing indicator bit positions for compensating said second signal dependent on the number of data bits and the number of non-data bits in said stuffing bit positions in a frame of said incoming digital signal.

6. The apparatus as defined in claim 5 wherein said means for compensating includes means for determining the number of data bits and the number of non-data bits in said stuffing bit positions and means for adjusting said second signal in response to said number of data bits and said number of non-data bits in said stuffing bit positions.

7. The apparatus as defined in claim 6 wherein said means for adjusting includes controllable divider means.

8. The apparatus as defined in claim 7 wherein said means for determining includes means for generating logical signals representative of the number of data bits and the number of non-data bits in said stuffing bit positions and said controllable divider means being responsive to said logical signals to divide said output timing signal by a second predetermined divisor in response to said logical signals being representative of a first predetermined number of data bits and a first predetermined number of non-data bits in said stuffing bit positions, to divide said output timing signal by a third predetermined divisor in response to said logical signals being representative of a second predetermined number of data bits and a second predetermined number of non-data bits in said stuffing bit positions and to divide said output timing signal by a fourth predetermined divisor in response to said logical signals being representative of a third predetermined number of data bits and a third predetermined number of non-data bits in said stuffing bit positions.

9. The apparatus as defined in claim 8 further including means for generating a reference signal having a predetermined bit rate and being in synchronism with said incoming data signal.

10. The apparatus as defined in claim 9 further including means for dividing said reference signal by a first predetermined divisor to obtain said first signal, and wherein the bit reat of said first signal and the bit rate of said second signal obtained by dividing said output timing signal by said second predetermined divisor are substantially equal.

11. The apparatus as defined in claim 10 wherein said output timing signal is divided by said second predetermined divisor when said first predetermined number of data bits and said first predetermined number of non-data bits are equal, by said third divisor when said second number of data bits is less than said second number of non-data bits and by said fourth divisor when said third number of data bits is greater than said third number of non-data bits.

12. The apparatus as defined in claim 11 wherein said third predetermined divisor is less than said second predetermined divisor and said fourth predetermined divisor is greater than said second predetermined divisor.

13. A method for generating an output timing signal for recovering data from an incoming digital signal having repetitive frames each of which has a predetermined total number of bit positions including a number of data bit positions, the number of data bit positions being less than the total number of bit positions, comprising the steps of:

generating a clock signal which is in synchronism with the incoming digital signal;

dividing said clock signal by a first predetermined divisor to generate a reference clock signal, said first predetermined divisor being a value equal to a first predetermined fractional portion of the total number of bit positions in a frame of the incoming digital signal;

generating an error signal in response to said reference clock signal and to a phase clock signal;

generating a control signal representative of a smooth version of said error signal;

controlling a voltage controlled oscillator with said control signal to generate the output timing signal; and dividing said output timing signal by a second predetermined divisor to generator said phase clock signal, said second predetermined divisor being a value equal to a second predetermined fractional portion of the number of data bit positions in a frame of the incoming digital signal.

14. A method for generating an output timing signal for recovering data from an incoming digital signal including repetitive frames each of which has a predetermined number of stuffing bit positions, and a predetermined number of stuffing indicator bit positions including bits which indicate that said stuffing bit positions include either a data bit or a non-data bit therein, the method comprising the steps of:

generating an error signal in response to a first signal representative of a reference signal and to a second signal representative of the output timing signal;

generating a control signal representative of a smooth version of said error signal;

controlling a voltage controlled oscillator in response to said control signal to generate the output timing signal;

generating said second signal from said output timing signal;

obtaining bits from said stuffing indicator bit positions of the incoming digital signal; and compensating said second signal in response to a number of data bits and a number of non-data bits in said stuffing bit positions indicated by said bits from said stuffing indicator bit position in a frame of said incoming digital signal.

* * * * *